United States Patent
Manju et al.

(10) Patent No.: US 10,760,522 B2
(45) Date of Patent: Sep. 1, 2020

(54) CONTROL APPARATUS FOR AN INTERNAL COMBUSTION ENGINE

(71) Applicant: TOYOTA JIDOSHA KABUSHIKI KAISHA, Toyota-shi, Aichi-ken (JP)

(72) Inventors: Yoshinori Manju, Susono (JP); Kei Takachiho, Obu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 37 days.

(21) Appl. No.: 15/965,548

(22) Filed: Apr. 27, 2018

(65) Prior Publication Data

US 2018/0313292 A1 Nov. 1, 2018

(30) Foreign Application Priority Data

Apr. 28, 2017 (JP) ................. 2017-089852

(51) Int. Cl.
*F02D 41/00* (2006.01)
*F02D 41/40* (2006.01)
(Continued)

(52) U.S. Cl.
CPC .......... *F02D 41/401* (2013.01); *F02B 23/101* (2013.01); *F02B 23/104* (2013.01);
(Continued)

(58) Field of Classification Search
CPC .. F02D 41/401; F02D 41/002; F02D 41/1444; F02D 41/3836; F02D 41/402;
(Continued)

(56) References Cited

U.S. PATENT DOCUMENTS 5,586,524 A * 12/1996 Nonaka ................... F02B 33/04
123/478
9,145,823 B2 * 9/2015 Glugla ................ F02D 41/0002
(Continued)

FOREIGN PATENT DOCUMENTS

JP 2009-24685 2/2009
JP 2013-194691 9/2013
(Continued)

*Primary Examiner* — Phutthiwat Wongwian
*Assistant Examiner* — Sherman D Manley
(74) *Attorney, Agent, or Firm* — Finnegan, Henderson, Farabow, Garrett & Dunner, LLP

(57) ABSTRACT

The deterioration of combustion due to condensed water flowing into a cylinder is suppressed as much as possible. A control apparatus for an internal combustion engine is applied to an internal combustion engine which includes a fuel injection valve that directly injects fuel into a cylinder and a spark plug. The internal combustion engine is constructed so that the fuel goes to the spark plug. The control apparatus comprising a controller configured to: predict whether condensed water flows into the cylinder during an intake stroke; and carry out first injection control to perform fuel injection in a predetermined period of time within a period of time which is after closure of an exhaust valve and before the condensed water flows into the cylinder, and second injection control to perform fuel injection in a compression stroke before ignition, if an inflow of the condensed water into the cylinder is predicted.

12 Claims, 15 Drawing Sheets

(51) Int. Cl.
*F02D 41/14* (2006.01)
*F02B 23/10* (2006.01)
*F02D 41/38* (2006.01)
*F02M 26/17* (2016.01)
*F02M 26/22* (2016.01)
*F02D 41/18* (2006.01)
*F02B 37/00* (2006.01)
*F02M 26/04* (2016.01)

(52) U.S. Cl.
CPC ..... *F02D 41/0002* (2013.01); *F02D 41/1444* (2013.01); *F02D 41/402* (2013.01); *F02B 37/00* (2013.01); *F02D 41/0025* (2013.01); *F02D 41/0065* (2013.01); *F02D 41/18* (2013.01); *F02D 41/3836* (2013.01); *F02D 2041/389* (2013.01); *F02D 2200/04* (2013.01); *F02D 2200/0406* (2013.01); *F02D 2200/0414* (2013.01); *F02D 2200/0418* (2013.01); *F02M 26/04* (2016.02); *F02M 26/17* (2016.02); *F02M 26/22* (2016.02)

(58) Field of Classification Search
CPC .. F02D 41/0065; F02D 41/0025; F02D 41/18; F02D 41/047; F02D 41/005; F02D 2200/0418; F02D 2200/04; F02D 2200/0406; F02D 2041/389; F02M 26/17; F02M 26/22; F02M 26/04; F02B 23/104; F02B 23/101; F02B 37/00
See application file for complete search history.

(56) References Cited

U.S. PATENT DOCUMENTS

| | | | |
|---|---|---|---|
| 9,810,672 B2 * | 11/2017 | Basu | F01N 3/208 |
| 2002/0134081 A1 * | 9/2002 | Shiraishi | F01N 3/28 60/602 |
| 2008/0196695 A1 * | 8/2008 | Storhok | F02D 41/064 123/478 |
| 2008/0196696 A1 * | 8/2008 | Storhok | F02D 41/064 123/491 |
| 2014/0196685 A1 * | 7/2014 | Ruhland | F02B 17/005 123/295 |
| 2017/0074178 A1 | 3/2017 | Ogata et al. | |
| 2017/0314500 A1 | 11/2017 | Ogata et al. | |
| 2019/0063363 A1 * | 2/2019 | Ogata | F02D 41/14 |

FOREIGN PATENT DOCUMENTS

| | | |
|---|---|---|
| JP | 2015-183599 | 10/2015 |
| JP | 2016-89733 | 5/2016 |

* cited by examiner

[FIG. 1]
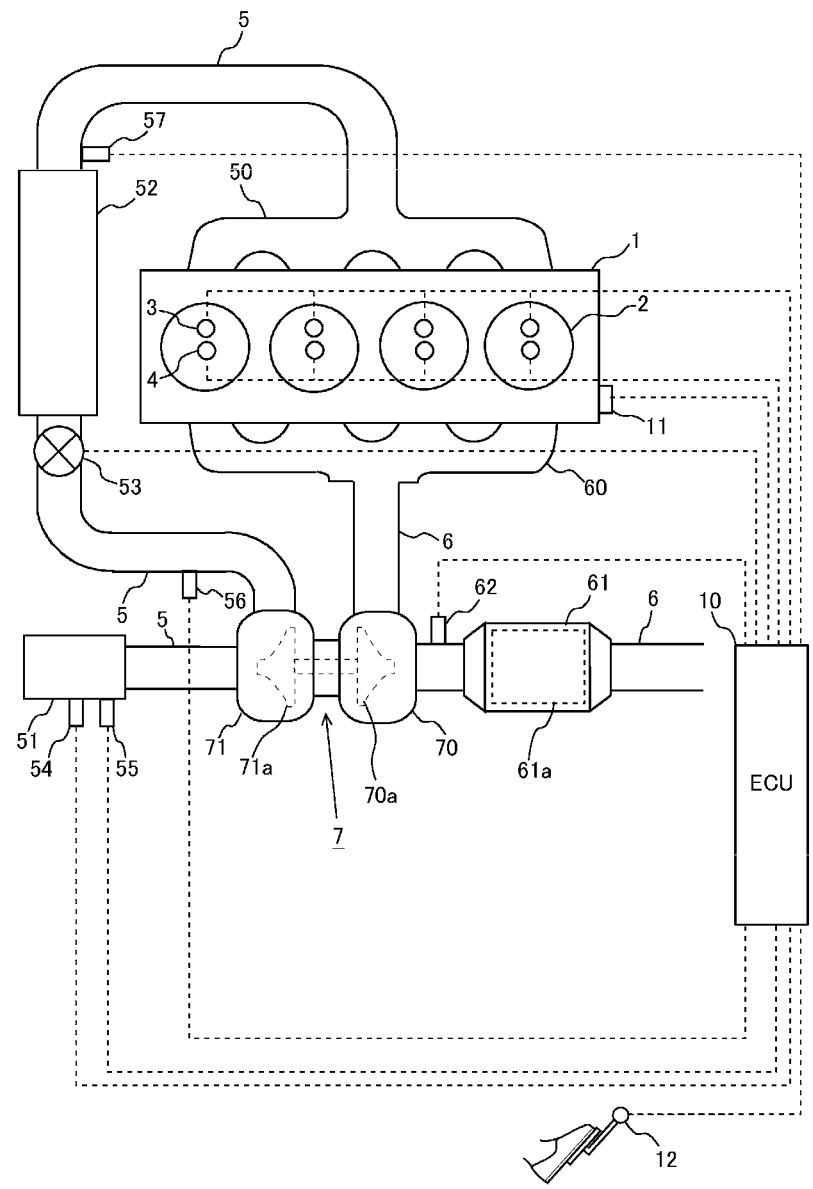

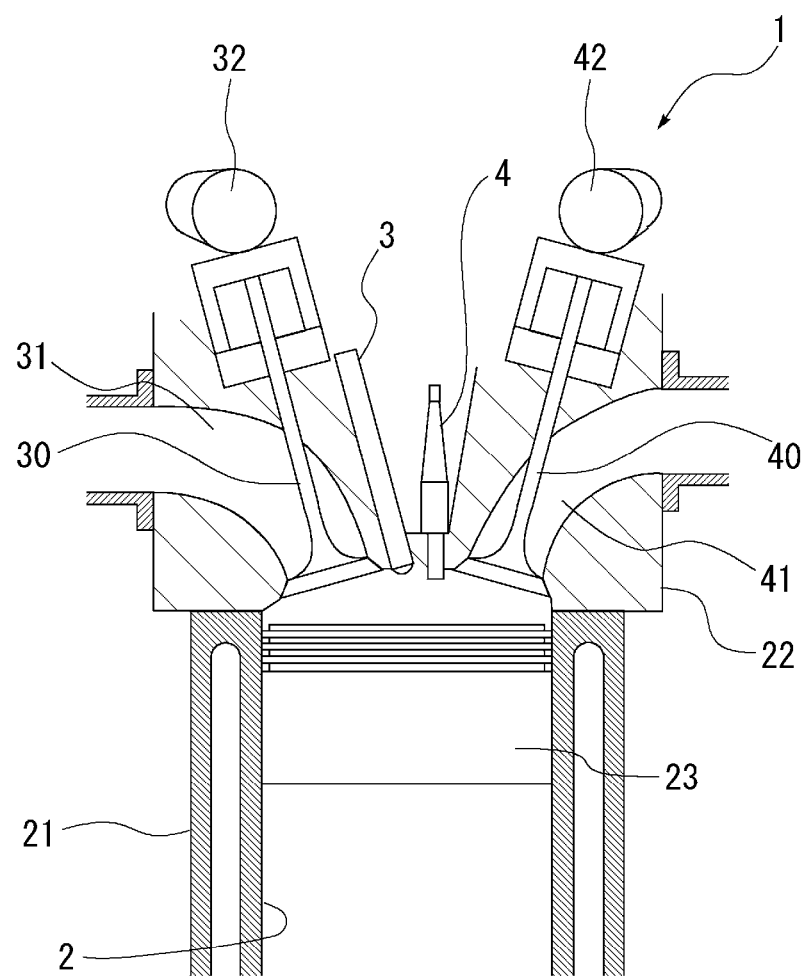
[FIG. 2]

[FIG. 3A]
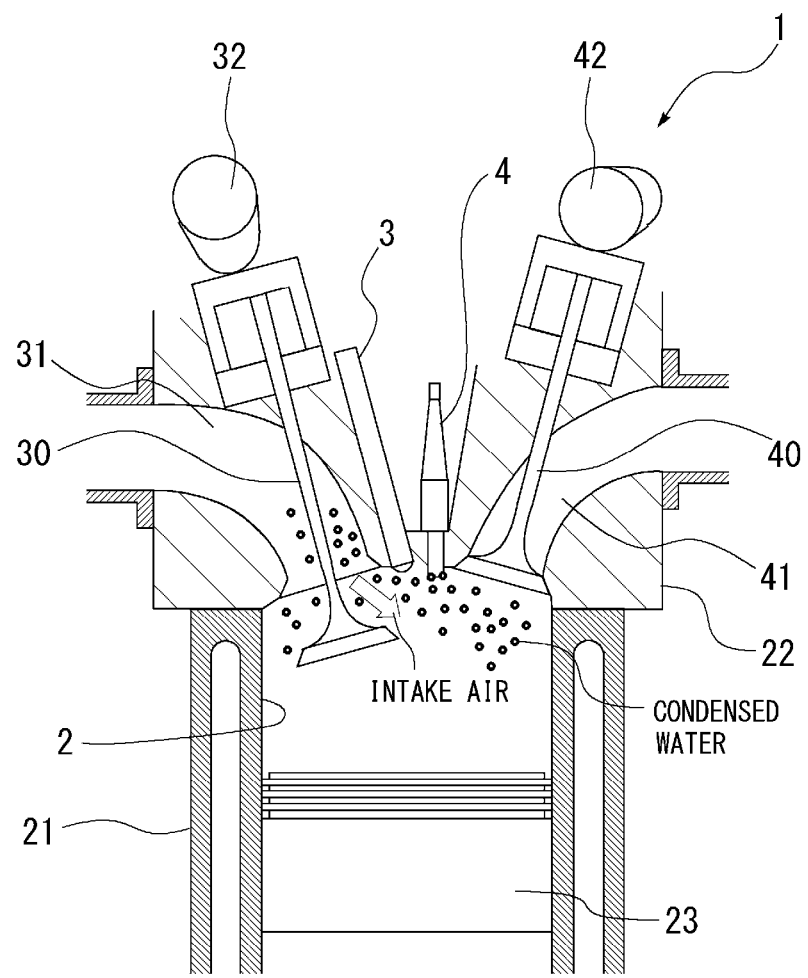

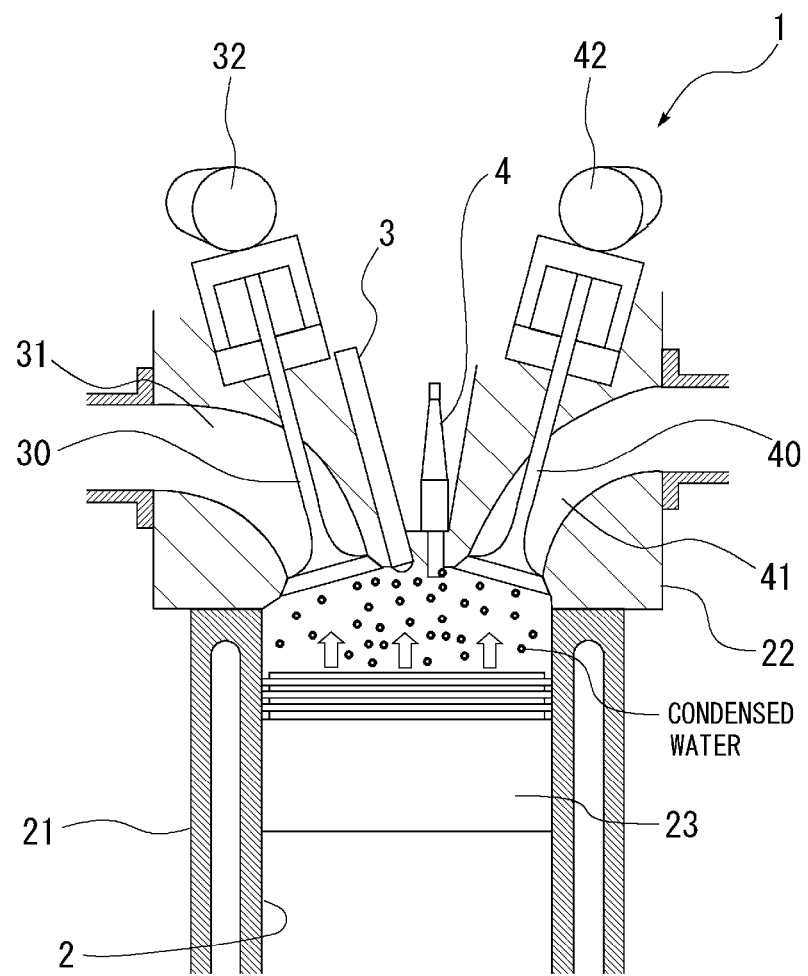
[FIG. 3B]

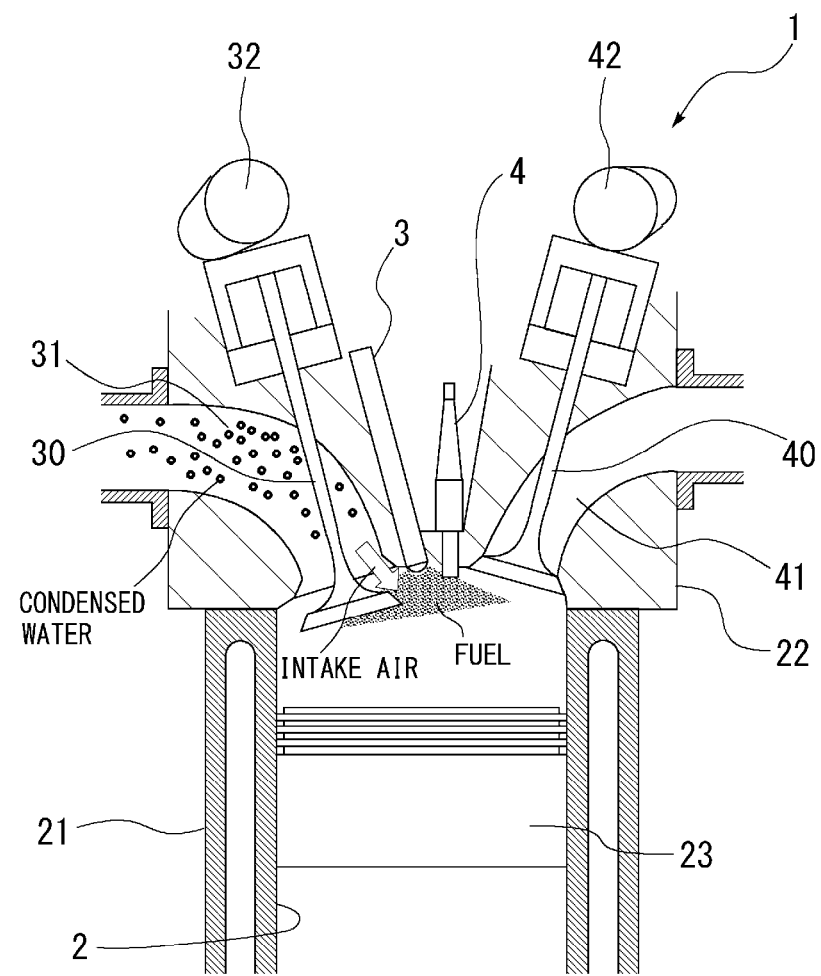
[FIG. 4]

[FIG. 5]
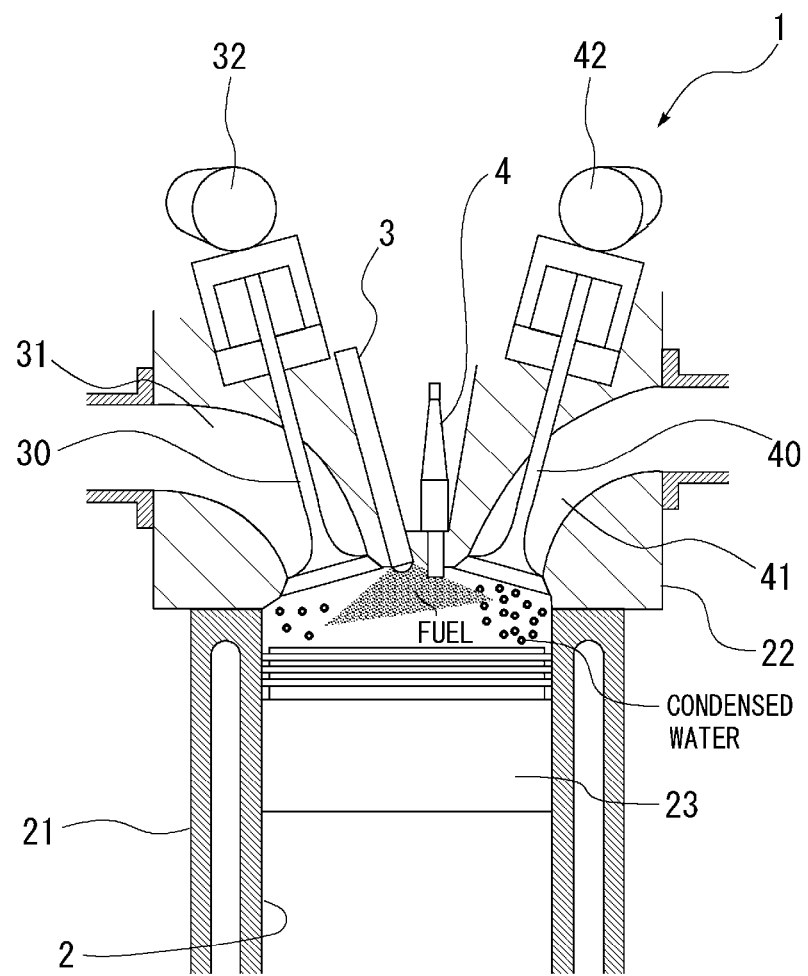

[FIG. 6]
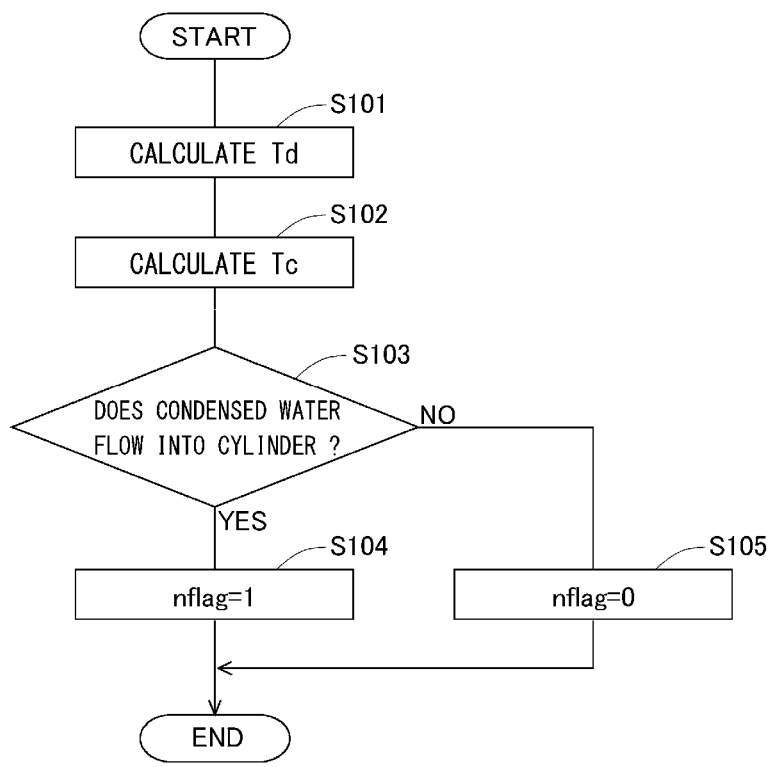

[FIG. 7]
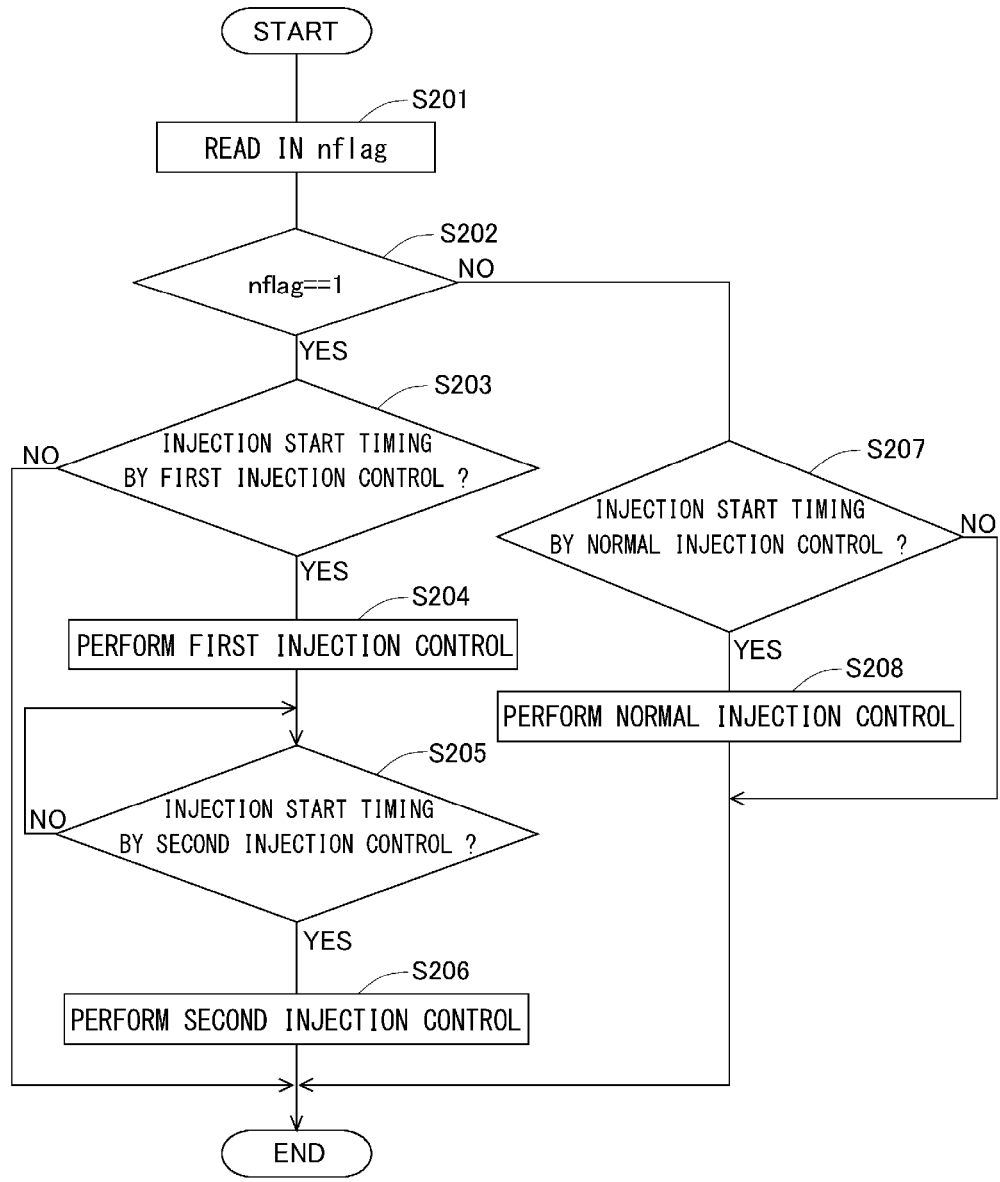

[FIG. 8]
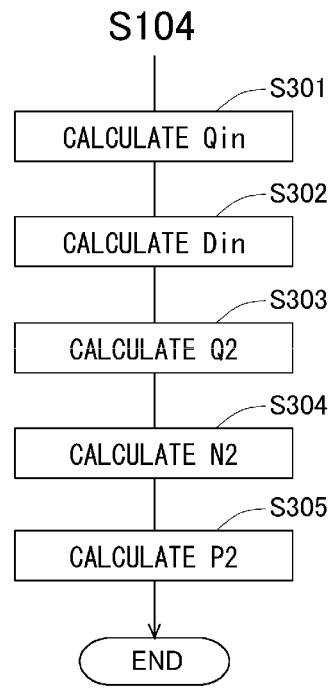
[FIG. 9A]
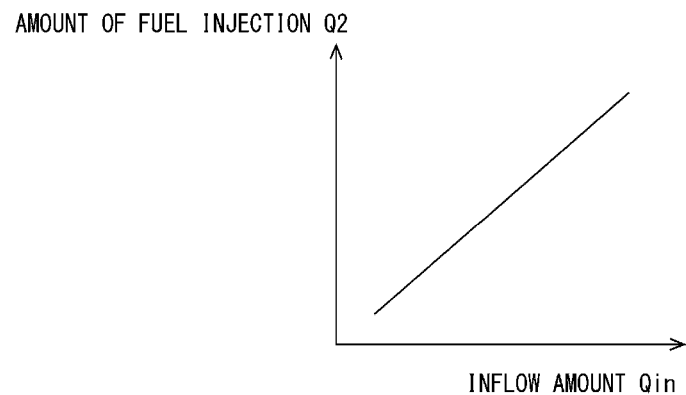

[FIG. 9B]
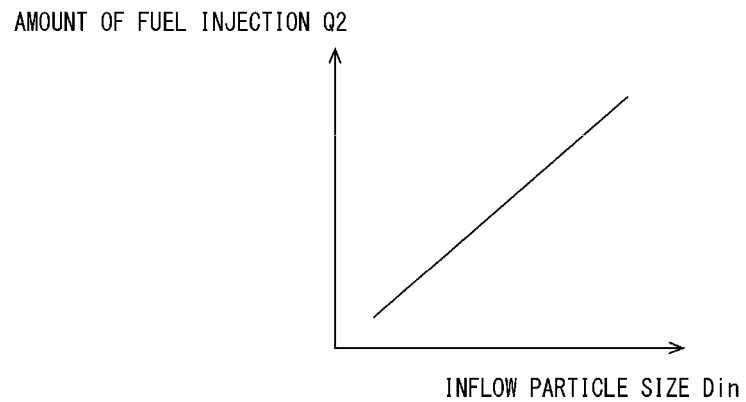
[FIG. 10A]
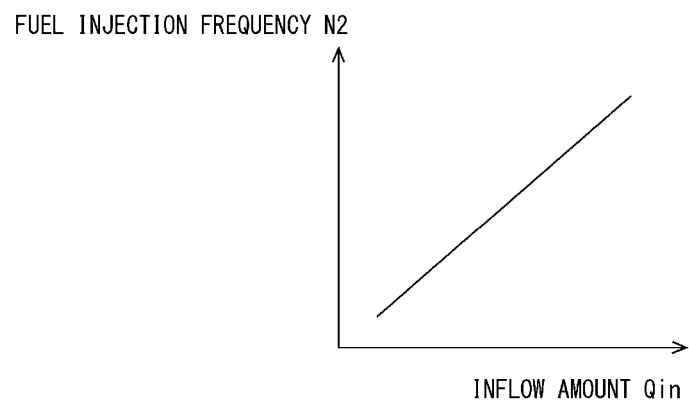
[FIG. 10B]
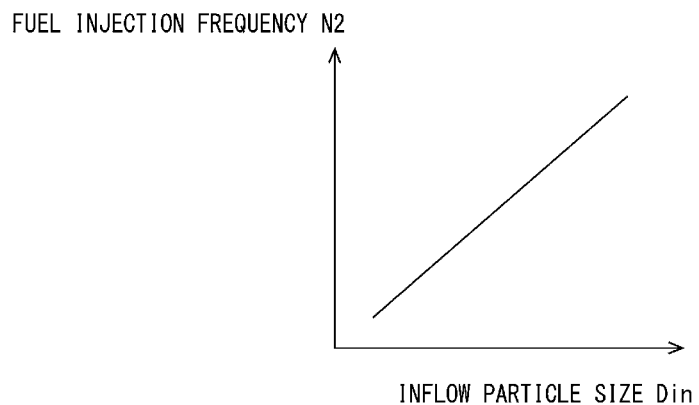

[FIG. 11A]
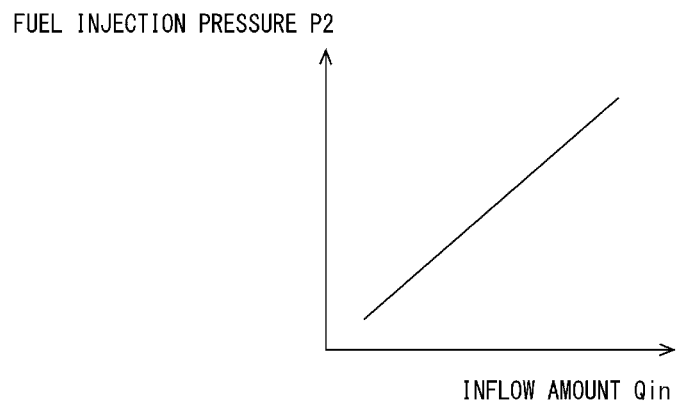
[FIG. 11B]
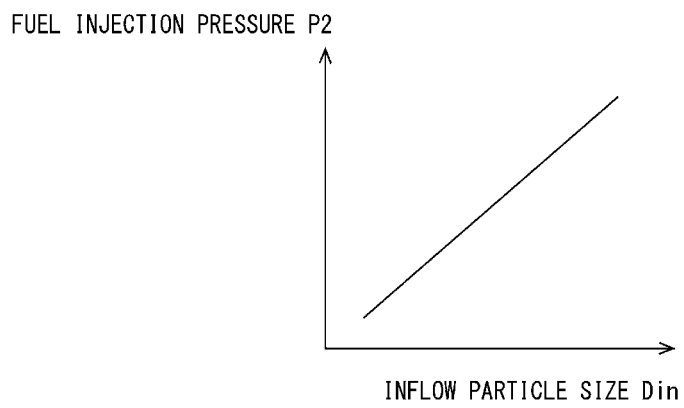

[FIG. 12]
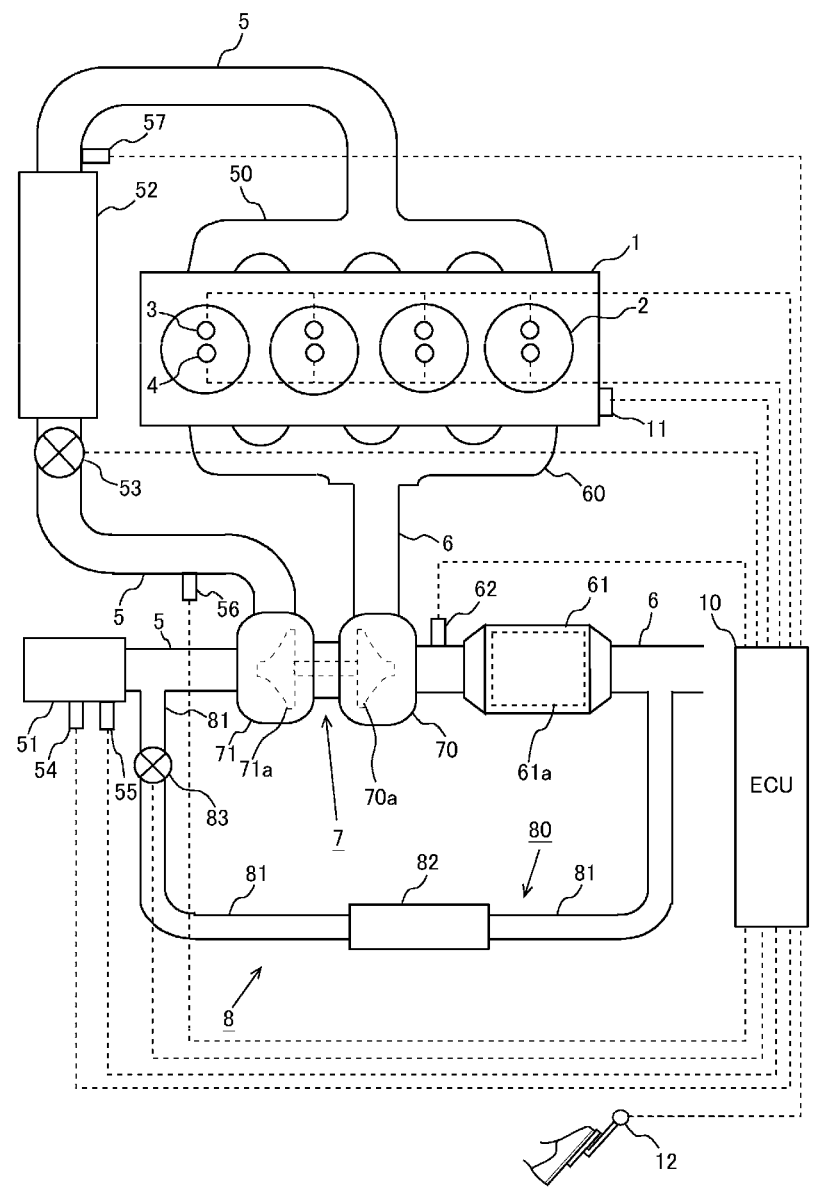

[FIG. 13]
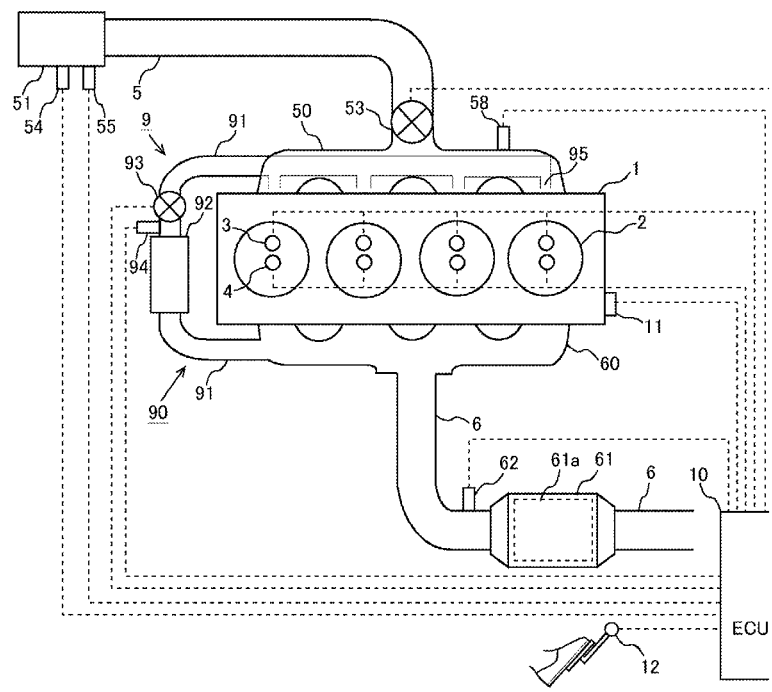

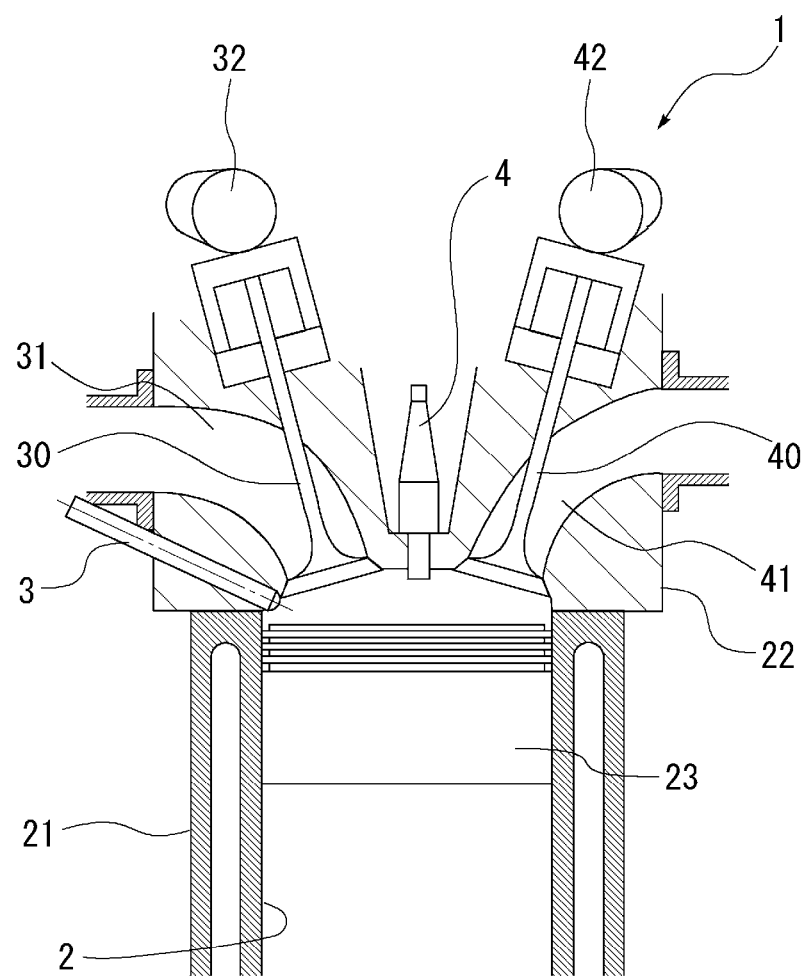
[FIG. 14]

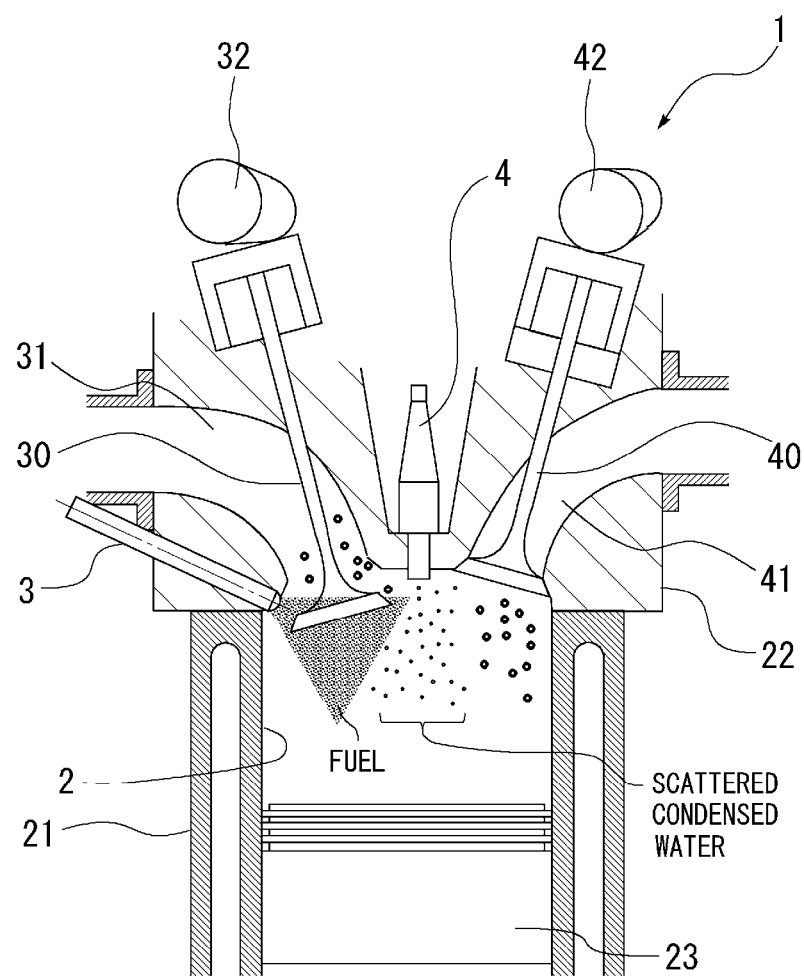
[FIG. 15]

CONTROL APPARATUS FOR AN INTERNAL COMBUSTION ENGINE

CROSS-REFERENCE TO RELATED APPLICATIONS

This application claims priority to Japanese Patent Application No. 2017-089852 filed on Apr. 28, 2017, the entire contents of which are incorporated by reference.

BACKGROUND

Technical Field

The present disclosure relates to a control apparatus for an internal combustion engine.

Description of the Related Art

There has been disclosed a technology in which in an internal combustion engine including a plurality of cylinders, a fuel injection condition for directly injecting fuel into a cylinder from a fuel injection valve is set to be different between a part of cylinders into which condensed water contained in intake air flows, and the remaining cylinders to which the inflow of condensed water is suppressed (for example, refer to patent document 1).

In addition, in patent literature 2, there is also disclosed a technology in which condensed water suppression control is carried out according to the detection of water in a cylinder. In such condensed water suppression control, the generation of condensed water is suppressed by controlling an exhaust gas recirculation (EGR) system or an intake air heater.

CITATION LIST

Patent Literature

Patent Literature 1: Japanese Patent Application Laid-Open No. 2009-024685
Patent Literature 2: Japanese Patent Application Laid-Open No. 2013-194691
Patent Literature 3: Japanese Patent Application Laid-Open No. 2016-089733
Patent Literature 4: Japanese Patent Application Laid-Open No. 2015-183599

SUMMARY

In the past, there has been known a technology in which the inflow of condensed water into a cylinder is suppressed by suppressing the generation of the condensed water. However, it may be difficult to suppress the generation of condensed water depending on the system configuration of an internal combustion engine or an atmospheric condition during operation of the internal combustion engine.

Moreover, there has also been known a technology in which the timing, amount and frequency of fuel injection from a fuel injection valve are changed with respect to a cylinder into which condensed water flows, thereby improving a combustion state in the cylinder. However, the technology of suppressing the deterioration of combustion due to the condensed water flowing into a cylinder in an appropriate manner still leaves room for improvement.

The object of the present disclosure is to provide a technology capable of suppressing the deterioration of combustion due to condensed water flowing into a cylinder as much as possible.

Solution to Problem

In a first aspect and a second aspect of the present disclosure, if the inflow of condensed water into a cylinder is predicted, first injection control and second injection control using a fuel injection valve for directly injecting fuel into the cylinder are carried out.

More specifically, a control apparatus for an internal combustion engine according to the first aspect of the present disclosure is applied to an internal combustion engine which includes a fuel injection valve that directly injects fuel into a cylinder of the internal combustion engine, and a spark plug that ignites a mixture of intake gas and fuel sucked into the cylinder, and which is constructed so that the fuel injected from the fuel injection valve goes to the spark plug. Then, said control apparatus comprises a controller comprising at least one processor configured to: predict whether condensed water generated in an intake gas passage where said intake gas flows through flows into said cylinder during intake stroke; and carry out first injection control to perform fuel injection from said fuel injection valve in a predetermined period of time within a period of time which is after closure of an exhaust valve and before said condensed water flows into said cylinder during the intake stroke, and second injection control to perform fuel injection from said fuel injection valve in compression stroke before said mixture is ignited by said spark plug, if the inflow of said condensed water into said cylinder is predicted.

Here, if it is estimated that condensed water has been generated in the intake gas passage, the controller can predict that the condensed water flows into the cylinder during the intake stroke. Alternatively, if it is estimated that condensed water of an amount equal to or more than a predetermined amount has been generated in the intake gas passage, the controller can predict that the condensed water flows into the cylinder during the intake stroke.

Then, when the condensed water flows into the cylinder, and the fuel injected into the cylinder may contact the condensed water, whereby the fuel and the condensed water may be mixed with each other. As a result of this, there is a fear that formation of a highly homogeneous mixture in the cylinder may be hindered. Here, note that the term "homogeneous mixture" referred to herein includes not only the homogeneous mixture in the entire cylinder, but also the homogeneous mixture in a certain region within the cylinder.

Accordingly, in the first injection control according to the first aspect of the present disclosure, if it is predicted that the condensed water will flow into the cylinder, fuel injection from the fuel injection valve is performed in the predetermined period of time within the period of time which is after the closure of the exhaust valve and before the condensed water flows into the cylinder during the intake stroke. Here, the predetermined period of time is after the closure of the exhaust valve and is an arbitrary period of time within the period of time before the condensed water flows into the cylinder during the intake stroke, and it is set, for example, according to the operating state of the internal combustion engine. In addition, in the first aspect of the present disclosure, if the inflow of the condensed water into the cylinder is predicted, the first injection control and the second injection control are carried out, as mentioned above, and hence, the predetermined period of time may be set based on the operating state of the internal combustion engine and a fuel injection condition in the second injection control. Then, when the first injection control is carried out, the influence of the condensed water on the formation of the mixture in the cylinder will be suppressed, thus making it possible to form the highly homogeneous mixture.

In addition, in a process in which the condensed water flows into the cylinder, there may occur a situation in which the spark plug is wetted with water. Moreover, in a process in which the condensed water having flowed into the cylinder thereafter moves through the interior of the cylinder, too, there may also occur the situation of the spark plug being wetted with water. Then, in the situation in which the spark plug is wetted with water, the density of water in the vicinity of the spark plug is apt to become relatively high (the term "the density of water" used here and hereafter including not only the density of water in a liquid phase but also the density of water in a gaseous phase), and as a result, the ratio of fuel in the mixture in the vicinity of the spark plug (intake gas, condensed water (water vapor) and fuel being included in this mixture) becomes easy to decrease. Consequently, there is a fear that initial ignitability to the mixture by the spark plug may be deteriorated.

Accordingly, in the second injection control according to the first aspect of the present disclosure, if it is predicted that the condensed water will flow into the cylinder, fuel injection from the fuel injection valve is performed in the compression stroke before the mixture is ignited by the spark plug. Here, the internal combustion engine according to the first aspect of the present disclosure is constructed so that fuel injected from the fuel injection valve goes to the spark plug. Accordingly, when fuel is injected from the fuel injection valve in the second injection control according to the first aspect of the present disclosure, the fuel thus injected scatters the condensed water (including water vapor evaporated from the condensed water) which exists in the vicinity of the spark plug. As a result, the density of water in the vicinity of the spark plug drops. In other words, the ratio of fuel in the mixture in the vicinity of the spark plug becomes high. In addition, by the second injection control according to the first aspect of the present disclosure, there is apt to be formed a stratified mixture in which fuel in the vicinity of the spark plug is enriched more than that in the surroundings thereof (in this case, the homogeneity of the mixture in a region surrounding an enriched region being made as high as possible by the first injection control). As a result of these, an improvement in the initial ignitability to the mixture by the spark plug can be attained.

As explained above, the control apparatus for an internal combustion engine according to the first aspect of the present disclosure carries out the above-mentioned first injection control and the above-mentioned second injection control, if the inflow of condensed water into the cylinder is predicted. As a result, before the condensed water flows into the cylinder, the homogeneity of the mixture in the cylinder can be made as high as possible. In addition, even after the condensed water has flowed into the cylinder, the initial ignitability to the mixture by the spark plug can be improved. Accordingly, it becomes possible to suppress the deterioration of combustion due to the condensed water flowing into the cylinder as much as possible.

Moreover, a control apparatus for an internal combustion engine according to the second aspect of the present disclosure is applied to an internal combustion engine which includes a fuel injection valve that directly injects fuel into a cylinder of the internal combustion engine, and a spark plug that is arranged in a substantial center of an upper portion of said cylinder so as to ignite a mixture of intake gas and fuel sucked into the cylinder, and which is constructed so that the fuel injected from said fuel injection valve goes to a central axis of said cylinder from a side portion thereof in the vicinity of an intake port which introduces said intake gas to said cylinder. Then, said control apparatus according to the second aspect of the present disclosure comprises a controller comprising at least one processor configured to carry out first injection control to perform fuel injection from said fuel injection valve in a predetermined period of time within a period of time which is after closure of an exhaust valve and before said condensed water flows into said cylinder during the intake stroke, and second injection control to perform fuel injection from said fuel injection valve during the inflow of said condensed water into said cylinder in a latter half of the intake stroke, if the inflow of said condensed water into said cylinder is predicted.

Then, the controller according to the second aspect of the disclosure also predicts whether condensed water flows into the cylinder during an intake stroke in the same way as the controller according to the first aspect of the present disclosure. Here, note that the first injection control performed by the controller according to the second aspect of the disclosure is the same as that performed by the controller according to the first aspect of the present disclosure.

Here, in the latter half of the intake stroke, an amount of lift of an intake valve becomes smaller, so the flow speed of the intake gas in the intake gas passage decreases. Then, when the flow speed of the intake gas decreases, the inflow rate or speed of the condensed water into the cylinder becomes easy to decrease. In other words, during the inflow of the condensed water into the cylinder in the latter half of the intake stroke, the inflow speed of the condensed water into the cylinder becomes easy to decrease. In addition, the internal combustion engine according to the second aspect of the present disclosure is constructed so that the fuel injected from the fuel injection valve goes to the central axis of the cylinder from a side portion of the cylinder in the vicinity of the intake port. Accordingly, when fuel is injected from the fuel injection valve in the second injection control according to the second aspect of the present disclosure, the fuel thus injected impinges and scatters the condensed water existing in the vicinity of the intake valve in the cylinder. As a result, the spark plug is suppressed from being wetted with water. This makes it possible to improve the initial ignitability to the mixture by the spark plug.

Further, after the closure of the exhaust valve, and before the opening of the intake valve (i.e., in a so-called negative overlap period of time), the condensed water does not flow into the cylinder. Accordingly, if the exhaust valve is closed before the intake valve is opened, the controllers according to the first aspect and the second aspect of the present disclosure may each start fuel injection before said intake valve is opened in said first injection control. By starting the fuel injection in this manner, it is possible to suppress the condensed water from affecting the formation of mixture in the cylinder, in an appropriate manner.

Furthermore, the controllers according to the first aspect and the second aspect of the present disclosure may each terminate the fuel injection in said first injection control before the amount of lift of the intake valve reaches substantially one third of a maximum amount of lift, after the opening of the intake valve.

Here, for some time from the opening of the intake valve, the flow speed of the intake gas in the intake gas passage becomes relatively slow, and a force acting from the intake gas to the condensed water becomes relatively small. Then, the condensed water is heavier than the intake gas, so at this time, the intake gas will mainly flow into the cylinder, even if the condensed water exists in the intake gas passage. On the other hand, when the amount of lift of the intake valve becomes large to some extent, the condensed water becomes easy to flow into the cylinder. Then, such a situation where the condensed water becomes easy to flow into the cylinder in this manner tends to easily occur when the amount of lift of the intake valve becomes equal to or more than one third of the maximum amount of lift. Accordingly, by terminating the fuel injection before the amount of lift of the intake valve reaches one third of the maximum amount of lift, it is possible to suppress the condensed water from affecting the formation of mixture in the cylinder, in an appropriate manner.

In addition, the control apparatuses for an internal combustion engine according to the first aspect and the second aspect of the present disclosure, wherein said controller may be further configured to: estimate an inflow amount, which is an amount of said condensed water flowing into said cylinder, if the inflow of said condensed water into said cylinder is predicted. Then, the controllers according to the first aspect and the second aspect of the present disclosure may each increase the injection amount, the injection frequency, or the injection pressure, of the fuel injection in said second injection control, as said inflow amount becomes larger.

Here, the larger the inflow amount, the more easily the spark plug tends to be wetted with water, so the more easily the density of water in the vicinity of the spark plug tends to become high, in the process in which the condensed water flows into the cylinder, and in the process in which the condensed water having flowed into the cylinder thereafter flows through the interior of the cylinder. On the other hand, when the injection amount, the injection frequency, or the injection pressure, of fuel injection in the second injection control according to the first aspect and the second aspect of the present disclosure is made to increase, it becomes easy to scatter the condensed water by means of the injected fuel. Accordingly, the more the inflow amount, the more possible it becomes to improve the initial ignitability to the mixture by the spark plug, by increasing the injection amount, the injection frequency, or the injection pressure, of the fuel injection in the second injection control.

Moreover, the control apparatuses for an internal combustion engine according to the first aspect and the second aspect of the present disclosure, wherein said controller may be further configured to: estimate an inflow particle size which is a particle size or diameter of said condensed water flowing into said cylinder, if the inflow of said condensed water into said cylinder is predicted. Then, the controllers according to the first aspect and the second aspect of the present disclosure may each increase the injection amount, the injection frequency, or the injection pressure, of the fuel injection in said second injection control, as said inflow particle size is larger.

Here, when the inflow particle size is large, the state of the condensed water becomes difficult to change from the liquid phase to the gaseous phase, in the process in which the condensed water having flowed into the cylinder flows through the interior of the cylinder. As a result, in the process in which the condensed water flows through the interior of the cylinder, the spark plug becomes easy to be wetted with water, so the density of water in the vicinity of the spark plug is apt to become high. On the other hand, when the injection amount, the injection frequency, or the injection pressure, of fuel injection in the second injection control according to the first aspect and the second aspect of the present disclosure is made to increase, it become easy to scatter the condensed water by means of the injected fuel. Accordingly, the larger the inflow particle size, the more possible it becomes to improve the initial ignitability to the mixture by the spark plug, by increasing the injection amount, the injection frequency, or the injection pressure, of the fuel injection in the second injection control.

Further, the internal combustion engines according to the first aspect and the second aspect of the present disclosure may each include an EGR device having an EGR passage that recirculates an EGR gas, which is a part of the exhaust gas discharged from the internal combustion engine, from an exhaust passage of the internal combustion engine to an intake passage thereof. In this case, the intake gas sucked into the cylinder contains outside air and the EGR gas. In addition, the intake gas passage through which said intake gas flows includes said intake passage and said EGR passage.

Here, when the EGR gas is recirculated to the intake passage, condensed water resulting from the EGR gas may be generated in the intake passage. In addition, condensed water may be generated in the EGR passage. Accordingly, with respect to the condensed water generated in this manner, too, if the inflow of the condensed water into the cylinder is predicted, the first injection control and the second injection control mentioned above are carried out. With this, it becomes possible to suppress the deterioration of combustion due to the condensed water flowing into the cylinder as much as possible.

According to the present disclosure, it is possible to suppress the deterioration of combustion due to condensed water flowing into a cylinder as much as possible.

BRIEF DESCRIPTION OF DRAWINGS

FIG. 1 is a diagram showing the general configuration of an internal combustion engine and its intake and exhaust systems according to a first embodiment of the present disclosure.

FIG. 2 is a view showing a cross-sectional schematic diagram of a cylinder of the internal combustion engine according to the first embodiment of the present disclosure.

FIG. 3A is a view schematically showing condensed water flowing into the cylinder during an intake stroke of the internal combustion engine.

FIG. 3B is a view schematically showing condensed water flowing through the interior of the cylinder during a compression stroke of the internal combustion engine.

FIG. 4 is a view schematically showing the injection of fuel from a fuel injection valve by first injection control according to the first embodiment of the present disclosure.

FIG. 5 is a view schematically showing the injection of fuel from the fuel injection valve by second injection control according to the first embodiment of the present disclosure.

FIG. 6 is a flow chart showing a processing flow for estimating the inflow of condensed water into the cylinder.

FIG. 7 is a flow chart showing a control flow for fuel injection from the fuel injection valve.

FIG. 8 is a flow chart showing a processing flow for carrying out the processing of calculating a condition for fuel injection from the fuel injection valve in the second injection control according to a first modification of the first embodiment of the present disclosure.

FIG. 9A is a graph showing a correlation between an inflow amount and an amount of fuel injection.

FIG. 9B is a graph showing a correlation between an inflow particle size and the amount of fuel injection.

FIG. 10A is a graph showing a correlation between the inflow amount and a fuel injection frequency.

FIG. 10B is a graph showing a correlation between the inflow particle size and the fuel injection frequency.

FIG. 11A is a graph showing a correlation between the inflow amount and a fuel injection pressure.

FIG. 11B is a graph showing a correlation between the inflow particle size and the fuel injection pressure.

FIG. 12 is a diagram showing the general configuration of an internal combustion engine and its intake and exhaust systems according to a second modification of the first embodiment of the present disclosure.

FIG. 13 is a diagram showing the general configuration of an internal combustion engine and its intake and exhaust systems according to a third modification of the first embodiment of the present disclosure.

FIG. 14 is a view showing a cross-sectional schematic diagram of a cylinder of an internal combustion engine according to a second embodiment of the present disclosure.

FIG. 15 is a view schematically showing the injection of fuel from a fuel injection valve by second injection control according to the second embodiment of the present disclosure.

DESCRIPTION OF EMBODIMENTS

In the following, modes for carrying out the present disclosure will be specifically described as embodiments for illustrative purposes with reference to the drawings. It should be understood that the dimensions, materials, shapes, relative arrangements, and other features of the components that will be described in connection with the embodiments are not intended to limit the technical scope of the present disclosure only to them, unless stated otherwise.

First Embodiment (Configuration of Internal Combustion Engine and its Intake and Exhaust Systems)

FIG. 1 is a diagram showing the general configuration of an internal combustion engine and its intake and exhaust systems according to an embodiment of the present disclosure. The internal combustion engine 1 shown in FIG. 1 is a spark ignition type internal combustion engine (gasoline engine) provided with a cylinder group including four cylinders 2. On the internal combustion engine 1, there are mounted fuel injection valves 3 for directly injecting fuel into the individual cylinders 2, respectively. In addition, on the internal combustion engine 1, there are mounted spark plugs 4 for igniting air fuel mixtures in the individual cylinders 2, respectively.

Here, a cross-sectional schematic diagram of a cylinder 2 of the internal combustion engine 1 is shown in FIG. 2. As shown in FIG. 2, the internal combustion engine 1 is provided with a cylinder block 21 and a cylinder head 22. The cylinder block 21 has a columnar-shaped cylinder 2 formed therein, and a piston 23 is received inside the cylinder 2 for sliding movement relative thereto. In addition, an intake port 31 and an exhaust port 41 are formed in the cylinder head 22. The cylinder head 22 is provided with an intake valve 30 for opening and closing an opening end of the intake port 31 connected to the cylinder 2, and an intake camshaft 32 for driving to open and close the intake valve 30. Also, the cylinder head 22 is provided with an exhaust valve 40 for opening and closing an opening end of the exhaust port 41 connected to the cylinder 2, and an exhaust camshaft 42 for driving to open and close the exhaust valve 40.

Then, in the internal combustion engine 1 according to this embodiment, the cylinder head 22 is provided with a fuel injection valve 3 and a spark plug 4 between the intake port 31 and the exhaust port 41. Here, the fuel injection valve 3 is arranged in such a manner that fuel is able to be injected from the vicinity of a central portion of an upper wall of a combustion chamber formed in the cylinder head 22. In other words, the internal combustion engine 1 according to this embodiment is an internal combustion engine of a so-called center injection type. Moreover, in this embodiment, the fuel injection valve 3 and the spark plug 4 are arranged in such a positional relationship that the fuel injected from the fuel injection valve 3 goes to the spark plug 4. Here, note that it is needless to say that such a positional relationship between the fuel injection valve 3 and the spark plug 4 is not achieved only by the internal combustion engine of the center injection type. For example, even in the case of an internal combustion engine of a so-called side injection type in which fuel is injected from a side portion of the cylinder 2 toward a central axis thereof, it is possible to direct the fuel injected from the fuel injection valve 3 toward the spark plug 4.

Here, reverting to FIG. 1, the internal combustion engine 1 is connected to an intake manifold 50 and an exhaust manifold 60. An intake passage 5 is connected to the intake manifold 50. In this intake passage 5, there is arranged a compressor housing 71 of a turbocharger 7 that is driven to operate with the use of the energy of an exhaust gas as a driving source. A compressor 71a is rotatably accommodated in the compressor housing 71. Then, an air cleaner 51 is arranged in the intake passage 5 at the upstream side of the compressor housing 71. Also, a throttle valve 53 is arranged in the intake passage 5 at the downstream side of the compressor housing 71. The throttle valve 53 serves to adjust the amount of intake air in the internal combustion engine 1 by changing the channel cross section of the intake passage 5. In addition, in the intake passage 5 at the downstream side of the throttle valve 53, there is arranged an intercooler 52 for performing heat exchange between intake air and cooling water. Although the intercooler 52 in this embodiment is an intercooler of a water cooling type, there is no intention to limit the intercooler 52 to this type, but an intercooler of an air-cooled type can also be used for the intercooler 52.

Further, in the air cleaner 51, there are arranged an air flow meter 54 and a humidity sensor 55. The air flow meter 54 outputs an electrical signal corresponding to an amount (mass) of intake air (air) flowing through the interior of the intake passage 5. The humidity sensor 55 is a sensor which outputs an electrical signal corresponding to the humidity of outside air. A boost pressure sensor 56 is arranged in the intake passage 5 at a location between the compressor housing 71 and the throttle valve 53. The boost pressure sensor 56 outputs an electrical signal corresponding to the pressure of the intake air flowing out from the compressor housing 71. In addition, a temperature sensor 57 is arranged in the intake passage 5 between the intercooler 52 and the intake manifold 50. The temperature sensor 57 outputs an electrical signal corresponding to the temperature of the intake air having passed through the intercooler 52.

On the other hand, an exhaust passage 6 is connected to the exhaust manifold 60. Then, in the exhaust passage 6, there are arranged a turbine housing 70 of the turbocharger 7, an air fuel ratio sensor 62 and a catalyst casing 61 in this order according to the flow of the exhaust gas. A turbine 70a is rotatably accommodated in the turbine housing 70. In addition, an exhaust gas purification catalyst 61a is accommodated in the catalyst casing 61. The exhaust gas purification catalyst 61a is, for example, a three-way catalyst. Moreover, the air fuel ratio sensor 62 outputs an electrical signal corresponding to the air fuel ratio of the exhaust gas discharged from the internal combustion engine 1.

Then, an electronic control unit (ECU) 10 is provided in combination with the internal combustion engine 1. This ECU 10 is a unit that controls the operating state of the internal combustion engine 1, etc. A variety of kinds of sensors such as a crank position sensor 11, an accelerator opening sensor 12, etc., in addition to the air flow meter 54, the humidity sensor 55, the boost pressure sensor 56, the temperature sensor 57 and the air fuel ratio sensor 62, are electrically connected to the ECU 10. The crank position sensor 11 is a sensor which outputs an electrical signal correlated with the rotational position of an engine output shaft (crankshaft) of the internal combustion engine 1. The accelerator opening sensor 12 is a sensor which outputs an electrical signal correlated with an amount of operation (accelerator opening) of an unillustrated accelerator pedal. Then, the output signals of these sensors are inputted to the ECU 10. The ECU 10 derives an engine rotational speed of the internal combustion engine 1 based on the output signal of the crank position sensor 11, and also derives an engine load of the internal combustion engine 1 based on the output signal of the accelerator opening sensor 12.

In addition, a variety of kinds of devices such as the fuel injection valves 3, the spark plugs 4, the throttle valve 53 and so on are electrically connected to the ECU 10. Thus, these variety of kinds of devices are controlled by the ECU 10. For example, the ECU 10 controls the timing of fuel injection from each fuel injection valve 3. Also, the ECU 10 controls the amount of fuel injection, the frequency of fuel injection, the pressure of fuel injection, etc.

(Estimation of the Generation of Condensed Water)

With the above-mentioned configuration shown in FIG. 1, it becomes easy to produce condensed water in the intercooler 52 through which the intake air having flowed out from the compressor housing 71 flows. Accordingly, in this embodiment, a prediction is made by the ECU 10 as to whether condensed water is generated in the intercooler 52. Here, note that the air cleaner 51, the intake passage 5, the compressor housing 71, the throttle valve 53, the intercooler 52, the intake manifold 50 and the intake port 31, through which air (including water vapor) corresponding to an intake gas in the present disclosure flows, correspond to an intake gas passage in the present disclosure, but in the following explanation, as an example, there is mentioned a case where condensed water is generated in the intercooler 52.

First, based on the temperature and the relative humidity of intake air flowing into the intercooler 52 (hereinafter, sometimes referred to as "cooler inflow intake air"), the ECU 10 calculates the water vapor pressure of the cooler inflow intake air. Here, the temperature of the cooler inflow intake air can be estimated by using the pressure of atmospheric air, the temperature of atmospheric air, and the boost pressure (measured by the boost pressure sensor 56). Alternatively, it can also be measured by using a temperature sensor. In addition, the relative humidity of the cooler inflow intake air is calculated based on the output value of the humidity sensor 55. Then, based on a map or function stored in advance, the ECU 10 calculates, as a dew point temperature of the cooler inflow intake air, a temperature at which the water vapor pressure thus calculated becomes a saturated water vapor pressure.

Further, the ECU 10 obtains the temperature of the intake air having passed through the intercooler 52 (hereinafter, sometimes referred to as a "post cooler intake air temperature"), based on the output value of the temperature sensor 57. Then, the ECU 10 predicts that condensed water is generated in the intercooler 52, if the post cooler intake air temperature becomes lower than the dew point temperature.

Moreover, the ECU 10 can estimate an amount of condensed water generated in the intercooler 52 per unit time (hereinafter, sometimes referred to as a "condensed water generation amount"). Specifically, the ECU 10 calculates a saturated water vapor pressure of the intake air flowing out from the intercooler 52 (hereinafter, sometimes referred to as "cooler outflow intake air"), based on the post cooler intake air temperature. Then, the condensed water generation amount is estimated based on the vapor pressure of the cooler inflow intake air, the saturated water vapor pressure of the cooler outflow intake air, the flow rate of intake air (measured by the air flow meter 54), and the boost pressure.

Further, the ECU 10 can estimate a particle size or diameter (hereinafter, sometimes referred to as a "generated particle size") of the condensed water generated in the intercooler 52. Here, the generated particle size tends to become larger, as the flow rate of intake air is smaller. In addition, the generated particle size tends to become larger, as a temperature difference between the dew point temperature of the cooler inflow intake air and the wall temperature of a core of the intercooler 52 (this wall temperature being able to be calculated based on, for example, the temperature of the cooling water flowing through the intercooler 52) is larger. Accordingly, the ECU 10 estimates the generated particle size based on these correlations.

(Combustion Deterioration Suppression Control)

When the condensed water flows into the cylinder 2 of the internal combustion engine 1, the combustion state of the mixture in the cylinder 2 tends to be deteriorated. The reasons for this will be explained hereinafter.

A first reason is that when the condensed water flows into the cylinder 2, formation of a highly homogeneous mixture in the cylinder 2 tends to be inhibited. When the condensed water flows into the cylinder 2, the fuel injected into the cylinder 2 contacts the condensed water, whereby the fuel and the condensed water may be mixed with each other. As a result of this, there is a tendency for formation of a highly homogeneous mixture in the cylinder 2 to be inhibited, thus deteriorating the combustion state in the cylinder 2.

A second reason is that the density of water in the vicinity of the spark plug 4 tends to become relatively high, due to the wetting of the spark plug 4 with the condensed water. Here, FIG. 3A schematically shows the condensed water flowing into the cylinder 2 during a compression stroke of the internal combustion engine 1, and FIG. 3B schematically shows the condensed water flowing through the interior of the cylinder 2 during an intake stroke of the internal combustion engine 1. As shown in FIG. 3A, the condensed water flows into the cylinder 2 together with the intake air. Then, as the intake air passes through the vicinity of the spark plug 4, the condensed water will also pass through the vicinity of the spark plug 4. As a result, there may occur a situation in which the spark plug 4 is wetted with the condensed water. In addition, the condensed water having flowed into the cylinder 2 tends to flow through the interior of the cylinder 2, due for example to a swirl of tumble flow of the intake air formed in the cylinder 2, or a reciprocating motion of the piston 23 in the cylinder 2. Then, as the condensed water flows through the interior of the cylinder 2, there may occur a situation in which the spark plug 4 is wetted by the condensed water, as shown in FIG. 3B. Thus, in such a situation in which the spark plug 4 is wetted with the water, the density of water in the vicinity of the spark plug 4 easily becomes relatively high, and as a result, the ratio of fuel in the mixture in the vicinity of the spark plug 4 becomes easy to drop. Consequently, there is a tendency that initial ignitability to the mixture by the spark plug 4 is deteriorated, and so, the combustion state in the cylinder 2 is deteriorated.

Accordingly, the ECU 10, which is a control apparatus for an internal combustion engine according to the present disclosure, predicts whether condensed water will flow into the cylinder 2 during the intake stroke. Then, if the inflow of the condensed water into the cylinder 2 is predicted, combustion deterioration suppression control including first injection control and second injection control to be described later is carried out.

First, the first injection control will be described. The first injection control is control in which if it is predicted that the condensed water will flow into the cylinder 2, fuel injection from the fuel injection valve 3 is performed in a predetermined period of time within a period of time which is after the closure of the exhaust valve 40 and before the condensed water flows into the cylinder 2 during the intake stroke. Here, the predetermined period of time is an arbitrary period of time within the period of time which is after the closure of the exhaust valve 40 and before the condensed water flows into the cylinder 2 during the intake stroke, and it is set, for example, according to the operating state of the internal combustion engine 1. Alternatively, the predetermined period of time may be set based on the operating state of the internal combustion engine 1 and a fuel injection condition in the second injection control to be described later. In this case, it is set for example based on the ratio of an amount of fuel injection in the second injection control to an amount of fuel injection in the first injection control, which is determined according to the amount of fuel injection in the second injection control.

Then, FIG. 4 is a view schematically showing the injection of fuel from the fuel injection valve 3 according to the first injection control. Here, FIG. 4 is the schematic view in a former half of the intake stroke and in a state in which the amount of lift of the intake valve 30 is relatively small and the flow speed of intake air is relatively slow. As shown in FIG. 4, when the amount of lift of the intake valve 30 is relatively small, the condensed water mainly stays in the intake port 31, and the intake air mainly flows into the cylinder 2. This is because the condensed water is heavier than the intake air, and so, when the flow speed of the intake air is relatively slow, the condensed water becomes difficult to flow into the cylinder 2 by being carried on the flow of the intake air. Thus, a certain period of time is required for the condensed water to flow into the cylinder 2 even during the intake stroke. Then, when fuel injection from the fuel injection valve 3 is performed in the predetermined period of time within the period of time which is before the condensed water flows into the cylinder 2, the influence of the condensed water on the formation of the mixture in the cylinder 2 will be suppressed, thus making it possible to form the highly homogeneous mixture.

Here, note that, by setting the start timing of the fuel injection by the first injection control after the closure of the exhaust valve 40, it is possible to suppress the fuel injected in the first injection control from flowing out into the exhaust port 41. In addition, when there exists a so-called negative overlap period in the valve timing of the internal combustion engine 1, the condensed water does not flow into the cylinder 2 in that period of time. For that reason, when the start timing of fuel injection by the first injection control is set in that period of time, the influence of the condensed water on the mixture formation in the cylinder 2 is suppressed in an appropriate manner.

In addition, in the first injection control, the fuel injection from the fuel injection valve 3 may be terminated before the amount of lift of the intake valve 30 reaches substantially one third of a maximum amount of lift from the opening of the intake valve 30. Here, when the amount of lift of the intake valve 30 becomes equal to or larger than one third of the maximum amount of lift, the flow speed of the intake air becomes relatively fast, so that the condensed water becomes easy to flow into the cylinder 2 by being carried on the flow of the intake air. Accordingly, by terminating the fuel injection before the amount of lift of the intake valve 30 reaches one third of the maximum amount of lift, it is possible to suppress the condensed water from affecting the formation of mixture in the cylinder 2, in an appropriate manner.

Next, the second injection control will be described. The second injection control is control in which if it is predicted that the condensed water will flow into the cylinder 2, the injection of fuel from the fuel injection valve 3 is performed in the compression stroke before the mixture is ignited by the spark plug 4. Then, FIG. 5 is a view schematically showing the injection of fuel from the fuel injection valve 3 according to the second injection control. The internal combustion engine 1 according to this first embodiment is configured so that the fuel injected from the fuel injection valve 3 goes to the spark plug 4, so that the condensed water existing in the vicinity of the spark plug 4 is scattered to the side of the exhaust valve 40 by the fuel injected from the fuel injection valve 3 going to the spark plug 4, as shown in FIG. 5. As a result, the density of water in the vicinity of the spark plug 4 drops, so the ratio of fuel in the mixture in the vicinity of the spark plug 4 becomes high. In addition, by the second injection control, there can be formed a stratified mixture in which the fuel in the vicinity of the spark plug 4 is enriched. As a result of these, an improvement in initial ignitability to the mixture by the spark plug 4 can be attained.

Now, reference will be made to the processing performed by the ECU 10 which is the control apparatus for an internal combustion engine according to the present disclosure. FIG. 6 is a flow chart showing a processing flow for estimating the inflow of condensed water into the cylinder 2. In this embodiment, this flow or routine is carried out at a predetermined operation interval in a repeated manner by the ECU 10 during the operation of the internal combustion engine 1. Here, note that in the following explanation, as an example, there is mentioned the case where condensed water is generated in the intercooler 52.

In this flow, first, in step S101, the dew point temperature Td of the cooler inflow intake air is calculated. In step S101, as mentioned above, the water vapor pressure of the cooler inflow intake air is calculated based on the temperature and the relative humidity of the cooler inflow intake air, and a temperature, which has the water vapor pressure thus calculated as its saturated water vapor pressure, is calculated as the dew point temperature Td of the cooler inflow intake air. Here, note that in step S101, the dew point temperature Td of the cooler inflow intake air may be obtained based on other well-known techniques. Then, in step S102, the post cooler intake air temperature Tc is calculated. In step S102, the post cooler intake air temperature Tc is calculated based on the output value of the temperature sensor 57.

Subsequently, in step S103, it is determined whether the condensed water flows into the cylinder 2 during the intake stroke. In step S103, if it is estimated that condensed water has been generated in the intercooler 52, it can be predicted that the condensed water flows into the cylinder 2 during the intake stroke. Here, when the post cooler intake air temperature Tc calculated in step S102 becomes lower than the dew point temperature Td of the cooler inflow intake air calculated in step S101, it can be estimated that condensed water has been generated in the intercooler 52. Alternatively, in step S103, if it is estimated that an amount of condensed water larger than a predetermined amount has been generated in the intercooler 52, it may be predicted that the condensed water will flow into the cylinder 2 during the intake stroke. Then, if an affirmative determination is made in step S103, the routine of the ECU 10 goes to the processing of step S104, whereas if a negative determination is made in step S103, the routine of the ECU 10 goes to the processing of step S105.

If an affirmative determination is made in step S103, then in step S104, an inflow flag "nflag" is set to 1. Here, the inflow flag nflag is a flag which is set to 1, if it is predicted that the condensed water will flow into the cylinder 2 during the intake stroke. Then, after the processing of step S104, the execution of this routine is ended. On the other hand, if a negative determination is made in step S103, then in step S105, the inflow flag "nflag" is set to 0. Then, after the processing of step S105, the execution of this routine is ended.

Moreover, FIG. 7 is a flow chart showing a control flow for the injection fuel from the fuel injection valve 3. In the control flow shown in FIG. 7, the above-mentioned combustion deterioration suppression control or normal injection control, which is fuel injection control at normal time, is carried out. In this embodiment, this flow or routine is carried out at a predetermined operation interval in a repeated manner by the ECU 10 during the operation of the internal combustion engine 1.

In this flow, first in step S201, the inflow flag nflag set by the processing of step S104 or S105 shown in the above-mentioned FIG. 6 is read in. Then, in step S202, it is determined whether the inflow flag nflag is 1. If an affirmative determination is made in step S202, in this case, it is predicted that the condensed water will flow into the cylinder 2 during the intake stroke, so the routine of the ECU 10 goes to the processing of step S203. On the other hand, if a negative determination is made in step S202, the routine of the ECU 10 goes to the processing of step S207.

If an affirmative determination is made in step S202, then, the control flow for the combustion deterioration suppression control is carried out. In this control flow, first, in step S203, it is determined whether it is the start timing of fuel injection by the first injection control. Here, the start timing of fuel injection is the timing which is set so as to terminate the injection of fuel by the first injection control in the period of time which is after the closure of the exhaust valve 40 and before the condensed water flows into the cylinder 2 during the intake stroke. Then, if an affirmative determination is made in step S203, the routine of the ECU 10 goes to the processing of step S204, whereas if a negative determination is made in step S203, the execution of this routine is terminated.

If an affirmative determination is made in step S203, then, the first injection control is carried out in step S204. In step S204, the injection of fuel by the first injection control is carried out for the predetermined period of time.

Subsequently, in step S205, it is determined whether it is fuel injection timing by the second injection control. Here, the start timing of fuel injection is the timing which is in the compression stroke before the ignition to the mixture by the spark plug 4, and at which it is made possible to scatter, before the ignition, the condensed water existing in the vicinity of the spark plug 4 by means of the injection of fuel by the second injection control. Then, if an affirmative determination is made in step S205, the routine of the ECU 10 goes to the processing of step S206, whereas if a negative determination is made in step S205, the ECU 10 repeats the processing of step S205.

If an affirmative determination is made in step S205, then, in step S206, the second injection control is carried out. Then, after the processing of step S206, the execution of this routine is ended. Here, note that the injection of fuel by the second injection control is carried out under an injection condition that it is made possible to scatter the condensed water existing in the vicinity of the spark plug 4 before the ignition thereof. This can be set according to the operating state of the internal combustion engine 1, and for example, when the pressure in the cylinder 2 at the time of carrying out the injection of fuel by the second injection control is high, the injection pressure of the fuel injection can be set high.

In addition, if an affirmative determination is made in step S202, then, a control flow for the normal injection control is carried out. In this control flow, first, in step S207, it is determined whether it is the start timing of fuel injection by the normal injection control. Here, the start timing of fuel injection is a predetermined timing which is decided according to the operating state of the internal combustion engine 1. Then, if an affirmative determination is made in step S207, the normal injection control is subsequently carried out in step S208. In step S208, the fuel injection control at normal time is carried out. Then, after the processing of step S208, the execution of this routine is ended. On the other hand, if a negative determination is made in step S207, the execution of this flow is ended.

The control apparatus for an internal combustion engine according to the present disclosure can suppress the deterioration of combustion due to the condensed water flowing into the cylinder 2 as much as possible, by carrying out the above-mentioned control flow.

Here, note that in this embodiment, a controller according to the present disclosure is achieved by the ECU 10 carrying out the processing of the above-mentioned flow shown in FIG. 6. and the processing of steps S201 to S206 in the above-mentioned flow shown in FIG. 7.

First Modification of the First Embodiment

Next, reference will be made to a first modification of the above-mentioned first embodiment of the present disclosure based on FIG. 8. Here, note that in this first modification, the detailed explanation of substantially the same configuration and substantially the same control processing as in the above-mentioned first embodiment will be omitted.

FIG. 8 is a flow chart showing a processing flow for carrying out the processing of calculating a condition for fuel injection from the fuel injection valve 3 in the second injection control. In this modification, this flow or routine is carried out at a predetermined operation interval in a repeated manner by the ECU 10 during the operation of the internal combustion engine 1. Here, note that in the following explanation, as an example, there is mentioned the case where condensed water is generated in the intercooler 52.

In the flow shown in FIG. 8, after the processing of step S104, an amount Qin of the condensed water flowing into the cylinder 2 (hereinafter, sometimes referred to as an "inflow amount") is calculated in step S301. In step S301, an amount of condensed water generated in the intercooler 52 per unit time (a condensed water generation amount) is estimated, and the inflow amount Qin is calculated based on the condensed water generation amount. Here, the inflow amount Qin is calculated in such a manner that the more the condensed water generation amount, the more the inflow amount Qin becomes. Note that, as mentioned above, the condensed water generation amount is calculated based on the water vapor pressure of the cooler inflow intake air, the saturated water vapor pressure of the cooler outflow intake air, the flow rate of intake air, and the boost pressure. In addition, in step S301, the inflow amount Qin may be obtained based on other well-known techniques.

Subsequently, in step S302, a particle size or diameter Din of the condensed water flowing into the cylinder 2 (hereinafter, sometimes referred to as an "inflow particle size") is calculated. In step S302, the particle size (the generated particle size) of the condensed water generated in the intercooler 52 is estimated, and the inflow particle size Din is calculated based on the generated particle size. Here, the inflow particle size Din is calculated in such a manner that the larger the generated particle size, the larger the inflow particle size Din becomes. Here, note that, as mentioned above, the generated particle size is calculated based on the flow rate of intake air, the temperature difference between the dew point temperature Td of the cooler inflow intake air and the wall temperature of the core of the intercooler 52. Further, in step S302, the inflow particle size Din may be calculated in such a manner that the larger the condensed water generation amount, the larger the inflow particle size Din becomes. In addition, in step S302, the inflow particle size Din may be obtained based on other well-known techniques.

Then, in step S303, an amount of fuel injection Q2 in the second injection control is calculated. In step S303, the amount of fuel injection Q2 is calculated based on the inflow amount Qin calculated in step S301, or based on the inflow particle size Din calculated in step S302, or based on the inflow amount Qin and the inflow particle size Din. Here, FIG. 9A is a graph showing a correlation between the inflow amount Qin and the amount of fuel injection Q2. In addition, FIG. 9B is a graph showing a correlation between the inflow particle size Din and the amount of fuel injection Q2. Then, as shown in FIG. 9A, the amount of fuel injection Q2 is calculated in such a manner that the more the inflow amount Qin, the more the amount of fuel injection Q2 becomes. Moreover, as shown in FIG. 9B, the amount of fuel injection Q2 is calculated in such a manner that the larger the inflow particle size Din, the more the amount of fuel injection Q2 becomes.

Thereafter, in step S304, a fuel injection frequency N2 in the second injection control is calculated. In step S304, the fuel injection frequency N2 is calculated based on the inflow amount Qin calculated in step S301, or based on the inflow particle size Din calculated in step S302, or based on the inflow amount Qin and the inflow particle size Din. Here, FIG. 10A is a graph showing a correlation between the inflow amount Qin and the fuel injection frequency N2. In addition, FIG. 10B is a graph showing a correlation between the inflow particle size Din and the fuel injection frequency N2. Then, as shown in FIG. 10A, the fuel injection frequency N2 is calculated in such a manner that in the same amount of fuel injection, the more the inflow amount Qin, the more the fuel injection frequency N2 becomes. Moreover, as shown in FIG. 10B, the fuel injection frequency N2 is also calculated in such a manner that in the same amount of fuel injection, the more the inflow particle size Din, the more the fuel injection frequency N2 becomes.

Subsequently, in step S305, a fuel injection pressure P2 in the second injection control is calculated. In step S305, the fuel injection pressure P2 is calculated based on the inflow amount Qin calculated in step S301, or based on the inflow particle size Din calculated in step S302, or based on the inflow amount Qin and the inflow particle size Din. Here, FIG. 11A is a graph showing a correlation between the inflow amount Qin and the fuel injection pressure P2. In addition, FIG. 11B is a graph showing a correlation between the inflow particle size Din and the fuel injection pressure P2. Then, as shown in FIG. 11A, the fuel injection pressure P2 is calculated in such a manner that the more the inflow amount Qin, the higher the fuel injection pressure P2 becomes. Moreover, as shown in FIG. 11B, the fuel injection pressure P2 is calculated in such a manner that the larger the inflow particle size Din, the higher the fuel injection pressure P2 becomes. Then, after the processing of step S305, the execution of this routine is ended.

Here, note that, in this first modification, all the processings of steps S303 to S305 may be carried out, or only a part of the processings thereof may be carried out. Then, a controller according to the present disclosure is achieved by the ECU 10 carrying out the processing of steps S301, S302. In addition, the controller according to the present disclosure may be achieved by the ECU 10 carrying out the second injection control based on parameters calculated in the processings of steps S303 to S305.

Second Modification of the First Embodiment

Next, reference will be made to a second modification of the above-mentioned first embodiment of the present disclosure based on FIG. 12. Here, note that in this second modification, the detailed explanation of substantially the same configuration and substantially the same control processing as in the above-mentioned first embodiment will be omitted.

FIG. 12 is a diagram showing the general configuration of an internal combustion engine and its intake and exhaust systems according to this second modification. The configuration shown in FIG. 12 is provided with an EGR device 8, in addition to the above-mentioned configuration shown in FIG. 1. The EGR device 8 according to this second modification has an EGR passage 80 which serves to recirculate an EGR gas from the exhaust passage 6 at the downstream side of the catalyst casing 61 to the intake passage 5 at the upstream side of the compressor housing 71. Then, the EGR passage 80 is composed of an EGR pipe 81, an EGR cooler 82 that is arranged to be connected to the EGR pipe 81 along the recirculation flow of the EGR gas for cooling the EGR gas, and an EGR valve 83 that controls the flow rate of the recirculating EGR gas. The EGR device 8 is comprised of the EGR pipe 81, the EGR cooler 82 and the EGR valve 83. Here, note that the ECU 10 controls the EGR valve 83 so as to achieve a requested EGR ratio which is decided according to the operating state of the internal combustion engine 1.

Here, a relatively large amount of water vapor is contained in the EGR gas. In addition, the intake gas containing outside air having passed through the air cleaner 51 and the EGR gas recirculated to the intake passage 5 has a tendency that the temperature thereof becomes high, as compared with the intake air containing only the outside air having passed through the air cleaner 51. Accordingly, the temperature and the relative humidity of the intake air flowing into the intercooler 52 (the cooler inflow intake air) become relatively high, and as a result, the water vapor pressure of the cooler inflow intake air tends to become high. In that case, the amount of condensed water generated in the intercooler 52 per unit time (the condensed water generation amount) is apt to increase, and the condensed water generated in the intercooler 52 becomes easy to flow into a cylinder 2. In addition, when the water vapor pressure of the cooler inflow intake air becomes high, the dew point temperature of the cooler inflow intake air becomes high, so the temperature difference between the dew point temperature of the cooler inflow intake air and the wall temperature of the core of the intercooler 52 is apt to become large. As a result, the particle size (the generated particle size) of the condensed water generated in the intercooler 52 is apt to become large.

Here, in this second modification, in the above-mentioned calculation of the dew point temperature Td of the cooler inflow intake air in step S101 of FIG. 6, the temperature of the cooler inflow intake air can be estimated by using an atmospheric air pressure, an atmospheric air temperature, a boost pressure, and a degree of opening of the EGR valve 83. In addition, the relative humidity of the cooler inflow intake air can be estimated by using the output value of the humidity sensor 55 and the degree of opening of the EGR valve 83. Specifically, in this second modification, in these estimations, consideration is given to a temperature and a composition of the EGR gas to be estimated based on the operating state of the internal combustion engine 1, and an amount of EGR gas to be estimated based on the degree of opening of the EGR valve 83.

In addition, in this second modification, the above-mentioned inflow amount Qin calculated in step S301 of FIG. 8 is apt to become relatively large. This is because the condensed water generation amount is apt to become large. Also, the inflow particle size Din calculated in step S302 is apt to become relatively large. This is because the generated particle size is apt to become large. Then, in this second modification, in step S303, the amount of fuel injection Q2 in addition to the inflow amount Qin and the inflow particle size Din is calculated in consideration of the requested EGR ratio. In this case, the amount of fuel injection Q2 is calculated in such a manner that the larger the degree of opening of the EGR valve 83, the more the amount of fuel injection Q2 becomes. In other words, the amount of fuel injection Q2 is calculated in such a manner that the more the amount of EGR gas, the more the amount of fuel injection Q2 becomes. Also, the requested EGR ratio is taken into consideration in steps S304 and S305, too. In this case, the fuel injection frequency N2 is calculated in such a manner that in the same amount of fuel injection, the larger the degree of opening of the EGR valve 83 (i.e., the more the amount of EGR gas), the more the fuel injection frequency N2 becomes, and the fuel injection pressure P2 is calculated in such a manner that the larger the degree of opening of the EGR valve 83 (i.e., the more the amount of EGR gas), the higher the fuel injection pressure P2 becomes.

Then, the control apparatus for an internal combustion engine according to the present disclosure can suppress the deterioration of combustion due to the condensed water flowing into the cylinder 2 as much as possible, by carrying out the first injection control and the second injection control mentioned above.

Third Modification of the First Embodiment

Next, reference will be made to a third modification of the above-mentioned first embodiment of the present disclosure based on FIG. 13. Here, note that in this third modification, the detailed explanation of substantially the same configuration and substantially the same control processing as in the above-mentioned first embodiment will be omitted.

FIG. 13 is a diagram showing the general configuration of an internal combustion engine and its intake and exhaust systems according to this third modification. The configuration shown in FIG. 13 is not provided with the turbocharger 7 and the intercooler 52, unlike the above-mentioned configuration shown in FIG. 1, and it is provided with an intake air pressure sensor 58, in place of the boost pressure sensor 56. The intake air pressure sensor 58 outputs an electrical signal corresponding to the pressure of intake air in the intake manifold 50.

In addition, the configuration shown in FIG. 13 is provided with an EGR device 9. The EGR device 9 according to this third modification has an EGR passage 90 that serves to recirculate an EGR gas from the exhaust manifold 60 to the intake manifold 50. Then, the EGR passage 90 is composed of an EGR pipe 91, an EGR cooler 92 that is arranged to be connected to the EGR pipe 91 along the flow of recirculation of the EGR gas for cooling the EGR gas, an EGR valve 93 that controls the flow rate of the recirculating EGR gas, and a nozzle portion 95 that is connected to each intake port of the intake manifold 50. In addition, a temperature sensor 94 for outputting an electrical signal corresponding to the temperature of the EGR gas having passed through the EGR cooler 92 is arranged in the EGR pipe 91 between the EGR cooler 92 and the EGR valve 93. The EGR device 9 is comprised of the EGR pipe 91, the EGR cooler 92, the EGR valve 93, the temperature sensor 94 and the nozzle portion 95.

With such a configuration, although no intercooler is provided, the EGR gas is cooled by the EGR cooler 92, so it becomes easy to generate condensed water in the EGR cooler 92. In addition, condensed water may also be generated in the nozzle portion 95. In other words, condensed water can be generated in the EGR passage 90. Here, note that the EGR passage 90 corresponds to the intake gas passage according to the present disclosure.

Accordingly, the ECU 10 predicts whether the condensed water thus generated flows into a cylinder 2 during an intake stroke. For example, when taking as an example a case where the condensed water is generated in the EGR cooler 92, the ECU 10 estimates the temperature and the relative humidity of the EGR gas flowing into the EGR cooler 92, based on the operating state of the internal combustion engine 1, and calculates the water vapor pressure of the EGR gas. Moreover, the ECU 10 obtains the temperature of the EGR gas having passed through the EGR cooler 92 based on the output value of the temperature sensor 94. Then, the ECU 10 estimates, based on these parameters, whether the condensed water has been generated in the EGR cooler 92, and makes the above-mentioned prediction.

Then, if the inflow of the condensed water into the cylinder 2 is predicted, the control apparatus for an internal combustion engine according to the present disclosure can suppress the deterioration of combustion due to the condensed water flowing into the cylinder 2 as much as possible, by carrying out the first injection control and the second injection control mentioned above.

Second Embodiment

Next, reference will be made to a second embodiment of the present disclosure based on FIGS. 14 and 15. Here, note that in this second embodiment, the detailed explanation of substantially the same configuration and substantially the same control processing as in the above-mentioned first embodiment will be omitted.

FIG. 14 is a cross-sectional schematic diagram of a cylinder 2 of an internal combustion engine 1 according to this second embodiment of the present disclosure. As shown in FIG. 14, in the internal combustion engine 1 according to this second embodiment, a cylinder head 22 is provided with a spark plug 4 between an intake port 31 and an exhaust port 41. In other words, the spark plug 4 is arranged substantially in the center of an upper portion of the cylinder 2. In addition, the cylinder head 22 is provided with a fuel injection valve 3 at the lower side of the intake port 31. Here, in this second embodiment, the fuel injection valve 3 is arranged in such a position that the fuel injected from the fuel injection valve 3 goes to the central axis of the cylinder 2 from a side portion of the cylinder 2 in the vicinity of the intake port 31. Then, the fuel injection valve 3 is arranged in such a manner that its axis of injection is directed to a lower side with respect to a horizontal plane (specifically, a gasket face between a cylinder block 21 and the cylinder head 22). For that reason, with the internal combustion engine 1 according to this second embodiment, the fuel injected from the fuel injection valve 3 is not directed to the spark plug 4. Accordingly, the ECU 10 carries out second injection control at timing different from that in the second injection control according to the above-mentioned first embodiment. Here, note that in this second embodiment, first injection control similar to the first injection control according to the above-mentioned first embodiment is carried out.

In this second embodiment, the same flow or routine as the above-mentioned flow shown in FIG. 7 is carried out. However, the timing of fuel injection by the second injection control according this second embodiment in the above-mentioned step S205 of FIG. 7 is different from that by the second injection control according to the above-mentioned first embodiment. Specifically, in this second embodiment, the timing of fuel injection of by the second injection control in the above-mentioned step S205 of FIG. 7 becomes a predetermined timing during the inflow of the condensed water into the cylinder 2 in a latter half of the intake stroke. Then, the second injection control to be carried out at such a timing will be explained based on FIG. 15. FIG. 15 is a view schematically showing the injection of fuel from the fuel injection valve 3 by the second injection control according to this second embodiment. As shown in FIG. 15, in the second injection control according to this second embodiment, the fuel injected from the fuel injection valve 3 goes to the central axis of the cylinder 2 from a side portion of the cylinder 2 in the vicinity of the intake port 31.

Then, when the second injection control is carried out, droplets of the injected fuel collide with the condensed water existing in the vicinity of the intake valve 30 in the cylinder 2. As a result, the condensed water will be scattered. Here, in a process in which the droplets of the fuel collide with the condensed water so that the condensed water is scattered, the condensed water tends to be atomized. In addition, in a process in which the condensed water flows through the interior of the cylinder 2, the smaller the particle size of the condensed water, the easier the state of the condensed water becomes to change from a liquid phase to a gaseous phase easily. In view of the above, when the condensed water is scattered and atomized by the second injection control, the spark plug 4 will be suppressed from being wetted with water in the process in which the condensed water flows through the interior of the cylinder 2. As a result, the density of water in the vicinity of the spark plug 4 is decreased, thus making it possible to improve initial ignitability to a mixture by the spark plug 4. Here, note that in the second injection control according to this second embodiment, too, the amount of fuel injection Q2, the fuel injection frequency N2, and the fuel injection pressure P2 can be calculated similarly as in the above-mentioned first embodiment.

The control apparatus for an internal combustion engine according to the present disclosure can suppress the deterioration of combustion due to the condensed water flowing into the cylinder 2 as much as possible, by carrying out such second injection control as well as the first injection control.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control apparatus for an internal combustion engine adapted to be applied to an internal combustion engine which includes a fuel injection valve that directly injects fuel into a cylinder of the internal combustion engine, and a spark plug that ignites a mixture of intake gas and fuel sucked into said cylinder, wherein said internal combustion engine is constructed so that the fuel injected from said fuel injection valve goes to said spark plug, said control apparatus comprising a controller comprising at least one processor configured to:

predict whether condensed water is generated in an intake gas passage configured for the passage of intake gas such that the condensed water flows into said cylinder during an intake stroke, wherein the at least one processor makes the prediction based on an intake air temperature output by a temperature sensor, at least one of a predetermined map or function, and a comparison of the intake air temperature and a dew point temperature; and carry out first injection control to perform fuel injection from said fuel injection valve in a predetermined period of time within a period of time which is after closure of an exhaust valve and before said condensed water flows into said cylinder during the intake stroke, and second injection control to perform fuel injection from said fuel injection valve during a compression stroke before said mixture is ignited by said spark plug, when the inflow of said condensed water into said cylinder is predicted, and when the inflow of said condensed water into said cylinder is not predicted, carry out a normal injection control different from the first and second injection controls.

2. A control apparatus for an internal combustion engine adapted to be applied to an internal combustion engine which includes a fuel injection valve that directly injects fuel into a cylinder of said internal combustion engine, and a spark plug that ignites a mixture of intake gas and fuel sucked into said cylinder, and is arranged in a substantial center of an upper portion of said cylinder, wherein said internal combustion engine is constructed so that the fuel injected from said fuel injection valve goes to a central axis of said cylinder from a side portion thereof in the vicinity of an intake port which introduces said intake gas to said cylinder, said control apparatus comprising a controller comprising at least one processor configured to:

predict whether condensed water is generated in an intake gas passage configured for the passage of intake gas such that the condensed water flows into said cylinder during an intake stroke, wherein the at least one processor makes the prediction based on an intake air temperature output by a temperature sensor, at least one of a predetermined map or function, and a comparison of the intake air temperature and a dew point temperature; and carry out first injection control to perform fuel injection from said fuel injection valve in a predetermined period of time within a period of time which is after closure of an exhaust valve and before said condensed water flows into said cylinder during the intake stroke, and second injection control to perform fuel injection from said fuel injection valve during the inflow of said condensed water into said cylinder in a latter half of the intake stroke, when the inflow of said condensed water into said cylinder is predicted, and when the inflow of said condensed water into said cylinder is not predicted, carry out a normal injection control different from the first and second injection controls.

3. The control apparatus for an internal combustion engine according to claim 1, wherein
when said exhaust valve is closed before said intake valve is opened, said controller starts fuel injection before said intake valve is opened in said first injection control.

4. The control apparatus for an internal combustion engine according to claim 2, wherein
when said exhaust valve is closed before said intake valve is opened, said controller starts fuel injection before said intake valve is opened in said first injection control.

5. The control apparatus of an internal combustion engine according to claim 1, wherein
said controller terminates the fuel injection in said first injection control before an amount of lift of said intake valve from the opening of said intake valve reaches substantially one third of a maximum amount of lift.

6. The control apparatus of an internal combustion engine according to claim 2, wherein
said controller terminates the fuel injection in said first injection control before an amount of lift of said intake valve from the opening of said intake valve reaches substantially one third of a maximum amount of lift.

7. The control apparatus for an internal combustion engine according to claim 1, wherein said controller is further configured to:
estimate an inflow amount which is an amount of said condensed water flowing into said cylinder, when the inflow of said condensed water into said cylinder is predicted;
wherein the controller increases an injection amount, an injection frequency, or an injection pressure, of the fuel injection in said second injection control, as said inflow amount is larger.

8. The control apparatus for an internal combustion engine according to claim 2, wherein said controller is further configured to:
estimate an inflow amount which is an amount of said condensed water flowing into said cylinder, when the inflow of said condensed water into said cylinder is predicted;
wherein the controller increases an injection amount, an injection frequency, or an injection pressure, of the fuel injection in said second injection control, as said inflow amount is larger.

9. The control apparatus for an internal combustion engine according to claim 1, wherein said controller is further configured to:
estimate an inflow particle size which is a particle size of said condensed water flowing into said cylinder, when the inflow of said condensed water into said cylinder is predicted;
wherein the controller increases an injection amount, an injection frequency, or an injection pressure, of the fuel injection in said second injection control, as said inflow particle size is larger.

10. The control apparatus for an internal combustion engine according to claim 2, wherein said controller is further configured to:
estimate an inflow particle size which is a particle size of said condensed water flowing into said cylinder, when the inflow of said condensed water into said cylinder is predicted;
wherein the controller increases an injection amount, an injection frequency, or an injection pressure, of the fuel injection in said second injection control, as said inflow particle size is larger.

11. The control apparatus of an internal combustion engine according to claim 1, wherein
said internal combustion engine further includes an EGR device having an EGR passage that recirculates an EGR gas, which is a part of an exhaust gas discharged from said internal combustion engine, from an exhaust passage of said internal combustion engine to an intake passage thereof;
said intake gas contains outside air and the EGR gas; and
said intake gas passage includes said intake passage and said EGR passage.

12. The control apparatus of an internal combustion engine according to claim 2, wherein
said internal combustion engine further includes an EGR device having an EGR passage that recirculates an EGR gas, which is a part of an exhaust gas discharged from said internal combustion engine, from an exhaust passage of said internal combustion engine to an intake passage thereof;
said intake gas contains outside air and the EGR gas; and
said intake gas passage includes said intake passage and said EGR passage.

* * * * *